Oct. 12, 1965    R. A. FISHER    3,210,906
FILLING MACHINE

Filed Jan. 31, 1962    8 Sheets-Sheet 1

FIG. 1

INVENTOR.
RICHARD A. FISHER
BY *Ooms, McDougall and Hersh*
ATTORNEYS

Oct. 12, 1965  R. A. FISHER  3,210,906
FILLING MACHINE

Filed Jan. 31, 1962  8 Sheets-Sheet 2

INVENTOR.
RICHARD A. FISHER
BY Ooms, McDougall
and Hersh
ATTORNEYS

Oct. 12, 1965  R. A. FISHER  3,210,906

FILLING MACHINE

Filed Jan. 31, 1962  8 Sheets-Sheet 4

*INVENTOR.*
RICHARD A. FISHER
BY *Ooms, McDougall and Hersh*
ATTORNEYS

Oct. 12, 1965 R. A. FISHER 3,210,906
FILLING MACHINE

Filed Jan. 31, 1962 8 Sheets-Sheet 6

FIG. 11

INVENTOR.
RICHARD A. FISHER
BY Ooms, McDougall
and Hersh
ATTORNEYS

FIG.13

United States Patent Office 3,210,906
Patented Oct. 12, 1965

3,210,906
FILLING MACHINE
Richard A. Fisher, Minneapolis, Minn., assignor to Anderson Machine & Tool Works, Inc., Chaska, Minn., a corporation of Minnesota
Filed Jan. 31, 1962, Ser. No. 170,107
12 Claims. (Cl. 53—131)

This invention relates to an apparatus for filling containers. The invention relates more particularly to the filling with liquid material of pipettes or similar elongated vessels having small diameter bores. An application for the machine to which this invention is specifically directed relates to the filling of pipettes with the sperm of bulls whereby the sperm can be efficiently employed in the artificial insemination of cattle.

One object of this invention relates to the provision of an apparatus capable of rapidly filling containers in an automatic fashion.

An additional object of this invention concerns the provision of an apparatus capable of automatically filling pipettes and similar elongated vessels having narrow passages therein.

It is further object of this invention to provide a machine capable of achieving the foregoing objects in an operation which includes stamping of the containers for coding thereof, filling the containers, sealing the containers and automatically ejecting the filled containers and waste material from the machine.

These and other objects of this invention will appear hereinafter and for purposes of illustration, but not of limitation, specific embodiments of this invention are shown in the accompanying drawings in which—

General description of the filling machine

As previously indicated, the machine of this invention is particularly suitable for the filling of pipettes, made of plastic or other materials, with sperm for use in the artificial insemination of cattle. The machine illustrated in the accompanying drawings is a specific example of an apparatus adapted for such a purpose. It will be understood, however, that other applications are contemplated and that various modifications in the specific parts of the machine could be made while remaining within the scope of this invention.

Figure 1:
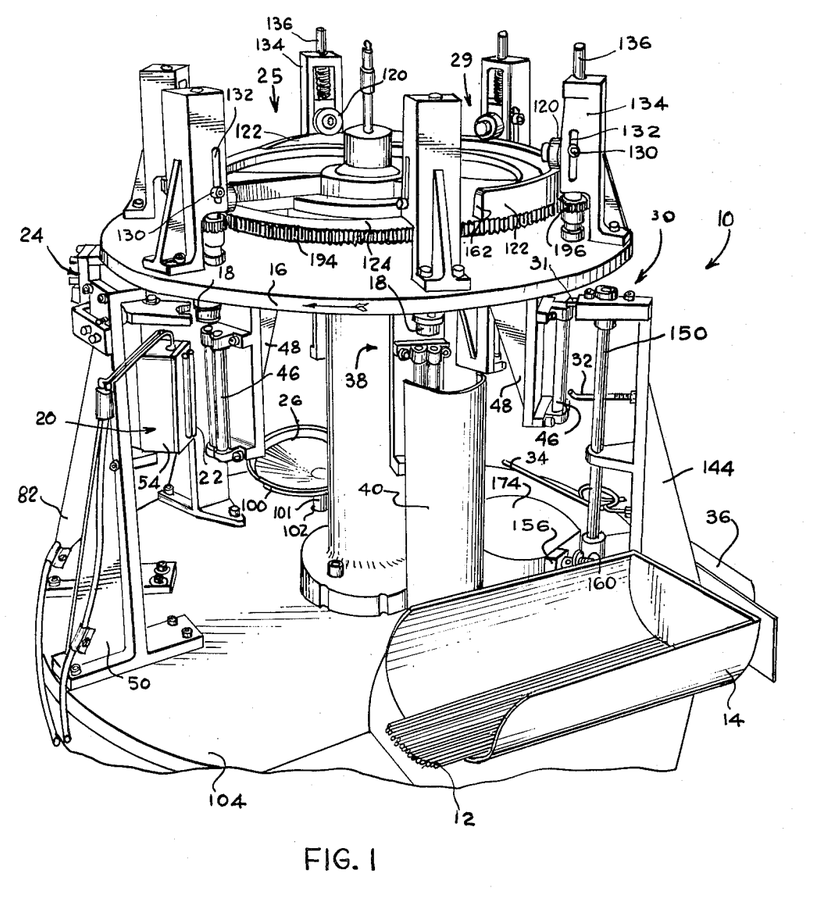
FIGURE 1 is a perspective view of a specific example of a filling machine characterized by the features of this invention.

The filling machine 10 shown in FIGURE 1 is provided with various stations whereby the pipettes 12 located in the tray 14 can be filled and otherwise operated upon to achieve the objects of this invention. In a typical machine operation, the plate 16 is adapted to rotate clockwise whereby the pipette holders 18 secured to the plate are continuously presented to the various stations of the machine. The pipettes 12 are adapted to be manually inserted into the holders 18 at a point just to the left of the tray 14.

A first stamping station 20 is provided with a stamping plate 22 whereby a code can be stamped in each pipette. Thus, in the case of sperm from a particular lot, identification of the pipettes is made possible.

A second stamping station 24 is located next to the station 20 whereby the pipettes can be sequentially numbered in order to differentiate pipettes of a given lot. It will be understood that various coding procedures can be employed and that it is not necessary to employ a plurality of coding stations.

A pipette filling station 25 is provided adjacent the coding stations. At the station 25 each of the pipettes 12 is adapted to be filled with material loaded in the dish 26.

A heating means such as a hot air gun 28 (FIGURE 13) is provided for sealing the pipettes 12. In this connection, it will be noted that where plastic material is employed in the manufacture of the pipettes, heat can be employed for sealing the small orifice therein. Alternatively, a clamping or crimping means can be located at the station 29 which combined with the plastic flow occasioned by the heat will serve to seal the pipettes. As one example, a roller can be located to press against the heated end of the pipette to insure a seal.

Figure 13:
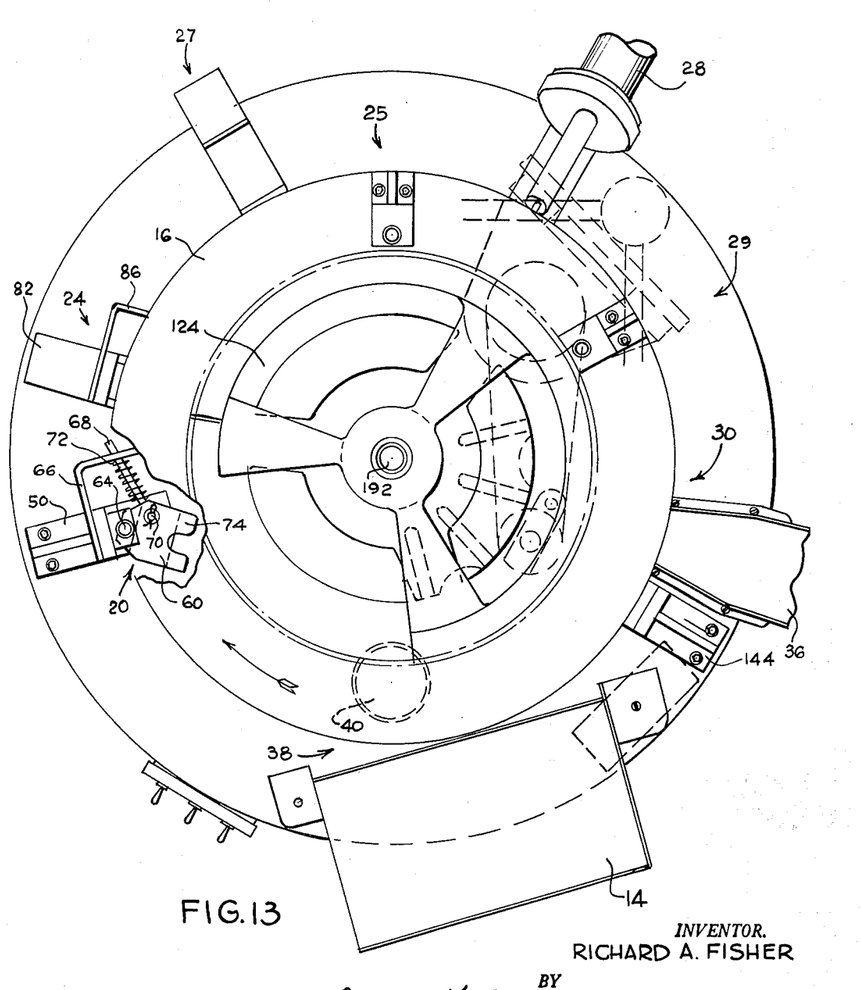
FIGURE 13 is a plan view, partly cut away, of the apparatus of this invention.

The air gun 28 is located whereby heat is applied near the extreme upper end of the exposed portion of the pipette. The bottom end of the pipette need not be sealed since the combination of capillary action and atmospheric pressure will retain the material within the pipettes.

A pipette cut-off station 30 is provided with a blade 31 for serving the pipettes at a point immediately above the sealed portion thereof. The station 30 includes a first finger 32 which maintains the severed pipette in the upright position as it falls under the influence of gravity. An elongated second finger 34 serves to guide the falling pipette to a chute 36 whereby they can be collected. The severed and sealed pipette is adapted to follow the path defined by the finger 34 whereby the pipettes will be uniformly directed to a collecting means.

At the station 38 means are provided for ejecting the waste end of the pipette retained within the holder 18 whereby a new pipette can be inserted in the holder. A waste container 40 is provided for collecting these ends.

It will be noted that in the illustrated embodiment, six holders 18 are provided. The machine of this invention is adapted to perform the described operations on pipettes contained within each of the holders and, accordingly, several of the operations at the described stations are carried out at about the same time. The automatic operations on each of the pipettes serve to provide a fast and highly efficient automatic system.

The above description will serve as a basis for an over-all understanding of the capabilities of the filling machine of this invention. The following portions of the specification will be devoted in part to a specific description of the various stations mentioned and to a disclosure of the drive means and other mechanisms employed for providing the cooperating operations.

Loading of pipettes

As previously noted, the pipettes 12 are adapted to be manually inserted in the holders 18 at a point to the left of the tray 14. In order to accomplish this the holder 18 is provided with an opening 42 of a diameter slightly larger than that of the pipettes 12. A gasket 44 within the opening 42 serves to resiliently hold pipettes which are pushed into the opening until the end within the opening is forcibly ejected.

Figures 2, 3, 4, 5:
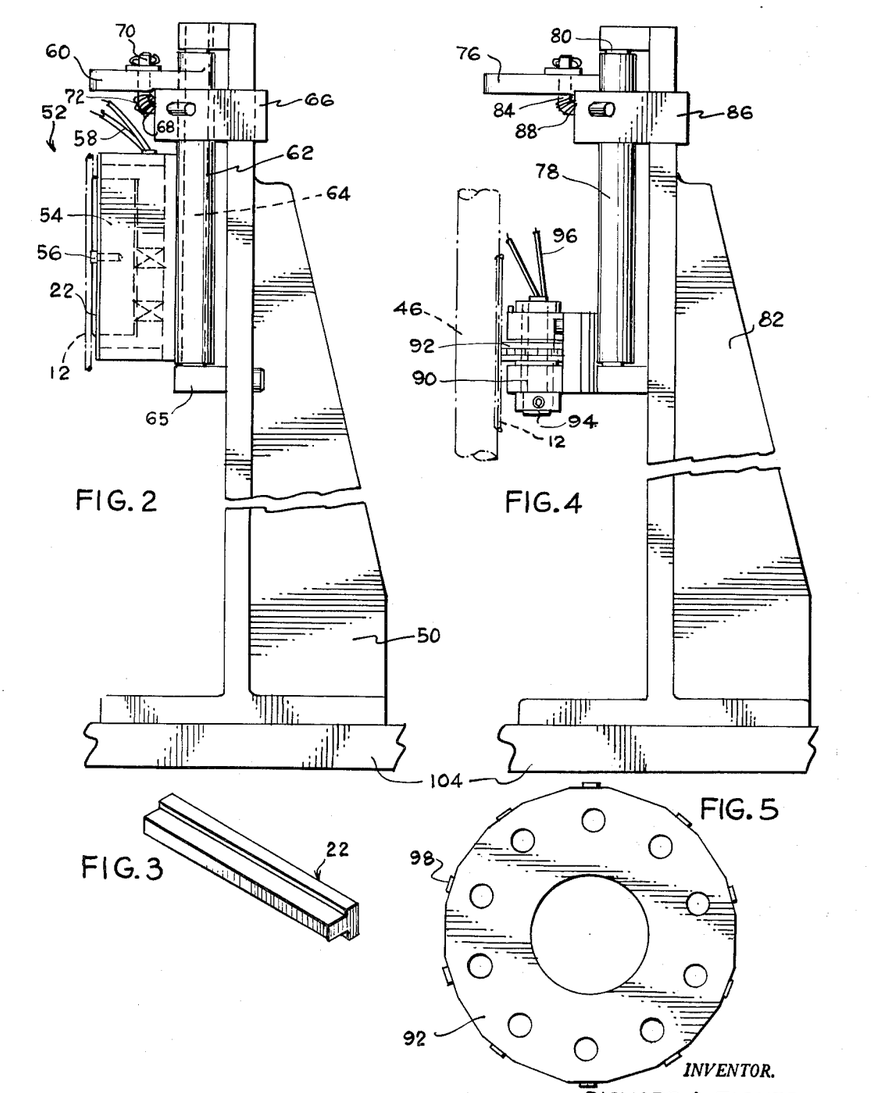
FIGURE 2 is a fragmentary elevational view of the lot coding means of the apparatus.
FIGURE 3 is a detail perspective view of a stamping plate employed in the lot coding stage.
FIGURE 4 is a fragmentary elevation of the sequential coding means employed in the apparatus.
FIGURE 5 is a detail plan view of the stamping means employed in the coding means of FIGURE 4.

It will be noted that a pair of upstanding cylindrical members 46, mounted on the bracket 48, are located below each of the holding means 18. The pipettes 12 retained in the holding means are adapted to be centered between the members 46 as shown in FIGURE 4. The members 46 serve as supporting means for the pipettes during each of the various operations. For example, during the stamping operations the members 46 will maintain the pipettes in a vertically aligned position when in contact with the stamping means.

First stamping operation

Referring specifically to FIGURES 2 and 3, there is shown an upstanding bracket 50 for holding stamping mechanism 52. The stamping mechanism comprises a support 54 for retaining the stamping plate 22 which is secured to the support by means of bolt 56. Electric leads 58 are provided for energizing internal heating means for the stamping mechanism.

A yoke member 60 is formed integral with a hollow cylinder 62 which is adapted to rotate relative to the shaft 64. The shaft 64 is secured at either end to extensions 65 on the bracket 50.

An L-shaped plate 66 (see also FIGURE 13) is mounted on the bracket 50. A rod 68 has one end adapted to reciprocate in a hole formed in the plate 66. The other end of the rod 68 is rotatably secured to the yoke member 60 at the point 70. Compression spring 72 normally holds the rod 68 in the position shown in FIGURE 13.

As a holder 18 approaches the yoke 60, the holder is adapted to engage yoke arm 74. As the holder 18 continues to move, the yoke 60 will swing in opposition to the action of spring 72. The support 54 for the stamping mechanism is secured to the cylindrical extension 62 of the yoke 60 and, therefore, the stamping mechanism will rotate with the yoke. Accordingly, the plate 22 will be brought into the path of movement of the pipette retained within the holder 18 and the pipette can be thus stamped. In the case of a plastic pipette, a heated stamping plate will facilitate the marking operation.

Second stamping operation

At the station 24, the pipettes are adapted to be stamped in an operation similar to that above described. Thus, there is provided at this station a yoke member 76 integral with cylinder 78 which is adapted to rotate about the shaft 80. This shaft is supported by means of upstanding bracket 82. A rod 84 has one end extending through a hole in plate 86 and a spring 88 normally retains the rod 80 and associated yoke 76 in a position the same as that described with respect to yoke 60.

When a holding means 18 engages an arm of the yoke 76, stamping means 90 secured to the cylinder 78 is adapted to rotate in response to this engagement. Associated with the stamping means there is provided a disc 92 rotatable on a shaft 94 located within the stamping means. The disc is provided with impression means 98 which are brought into the path of movement of the pipettes 12 upon rotation of the yoke 76. Heating means are preferably provided within the stamping means 90 and leads 96 are provided for this purpose. The disc 92 is adapted to be rotated periodically whereby different impressions can be provided for each successive series of pipettes.

Pipette filling operation

As the pipettes 12 retained in the holders 18 approach the station 25, the dish 26 is adapted to be lowered whereby the pipettes will pass over the rim thereof. The dish is then raised whereby the lower end of the pipettes will dip into the material in the dish and the material is then drawn into the pipettes.

Figure 12:
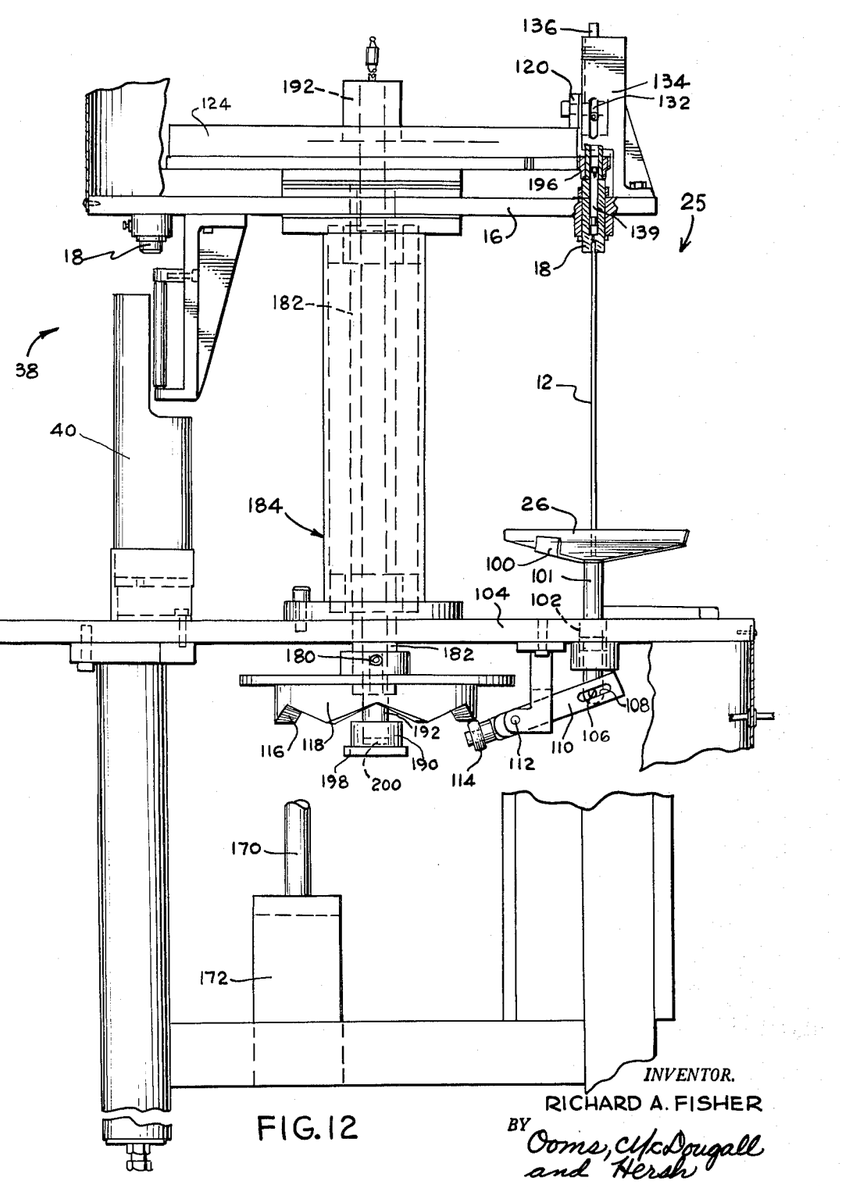
FIGURE 12 is an elevational view, partly cut away of the apparatus of this invention.

Referring in particular to FIGURE 12, it will be seen that the dish 26 is mounted on arms 100 which are integral with the shaft 101. The shaft is positioned for vertical reciprocal movement in a hole 102 located in the plate 104. A pin 106 is fitted in the end of the shaft 101 and engages slot 108 formed in the element 110. The element 110 is pivotally mounted at 112 and is provided with a rotary cam follower 114 at its end opposite the slot 108.

The cam follower 114 rides over cam surface 116 formed in the cam element 118. As the element 118 rotates, the element 110 will pivot whereby the shaft 101 and associated dish 26 will be raised and lowered. It will be apparent that by synchronizing the speed of rotation of the cam element 118 with the speed of rotation of the plate 16, the dish 26 can be raised and lowered whereby each of the pipettes 12 will ride over the rim of the dish and then into the dish for loading thereof.

As the ends of the pipettes 12 dip into the material in the dish 26, suction is created in the pipettes whereby the material in the dish is drawn into the pipettes. The suction is created as the rollers 120 associated with each holder 18 ride upwardly on the ridge 122 formed in the wheel 124.

Figure 6:
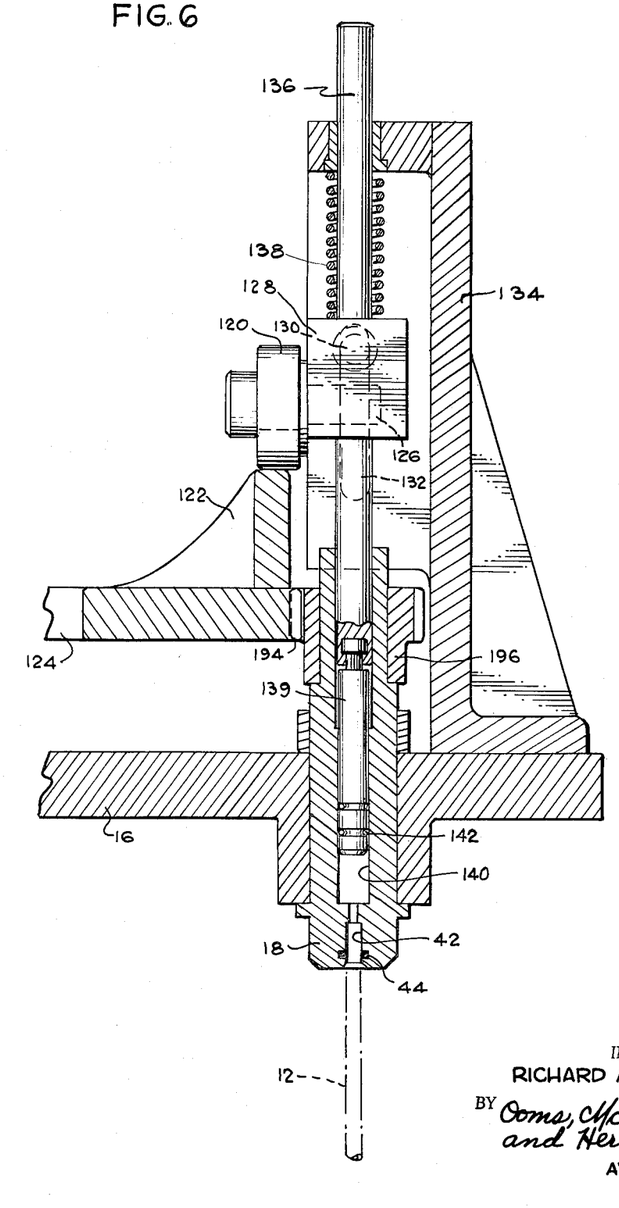
FIGURE 6 is a detail sectional elevation of the pipette filling mechanism employed in the apparatus.

As shown in FIGURE 1 and more specifically in FIGURE 6, the shaft 126 of the roller 120 is secured to a block 128. Arms 130 projecting from the block ride in slots 132 which are formed in housing 134. A rod 136 coupled with the block 128 is fitted within the housing and compression spring 138 normally urges the block and associated rod downwardly.

Secured at the lower end of the rod 136 is a piston 139. The piston is adapted to move within chamber 140 and gaskets 142 provide for sealing relationship between the piston and chamber wall.

The roller 120 for a given holder 18 is adapted to ride over the ridge 122 when the pipette associated with this holder has its end immersed in the material in dish 26. As the roller rides up the ridge, the piston 139 is raised within the chamber 140 and suction is created. It will be apparent that the length of the stroke of the piston 139 will determine the amount of suction, and this can be adjusted to insure against drawing of material into the chamber 140.

Cut-off operation

Figures 7, 8, 9:
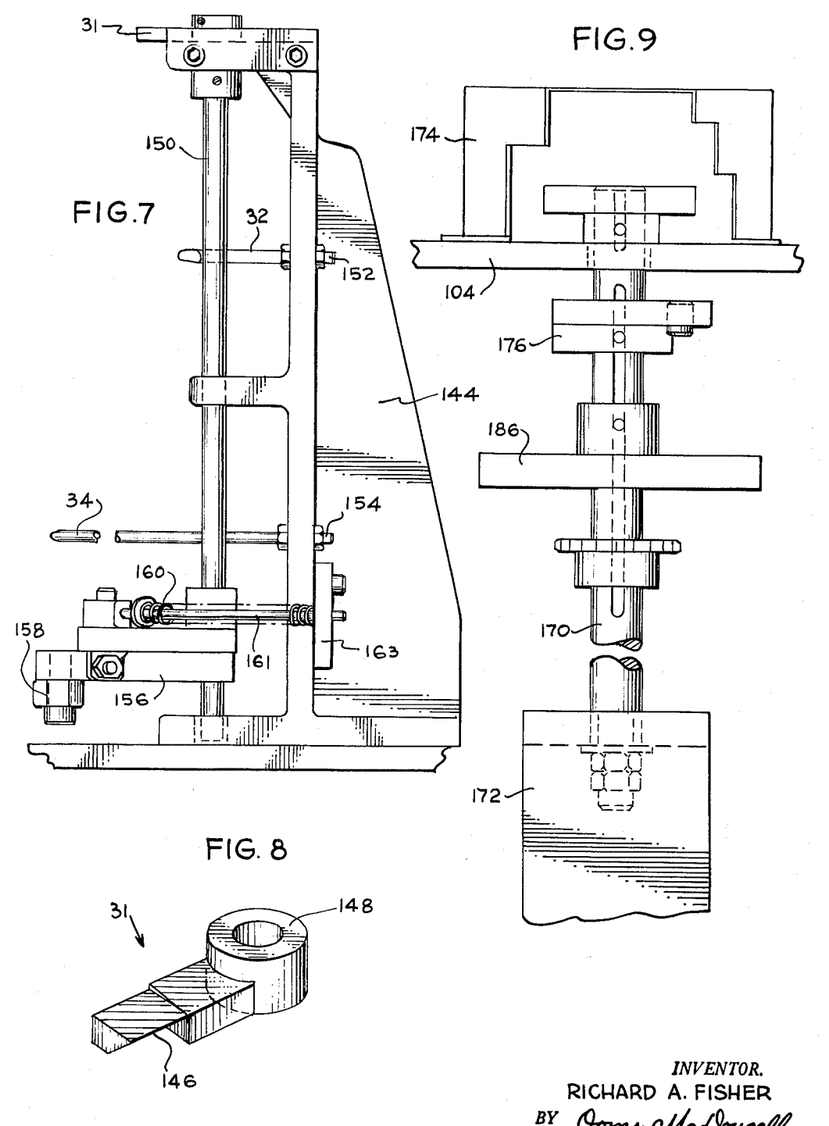
FIGURE 7 is a detail elevation of the cut-off device employed in the apparatus.
FIGURE 8 is a detail perspective view of the cut-off blade employed in the mechanism shown in FIGURE 7.
FIGURES 9 and 10 represent detail elevational views of portions of the machine drive mechanism.
Figure 10:
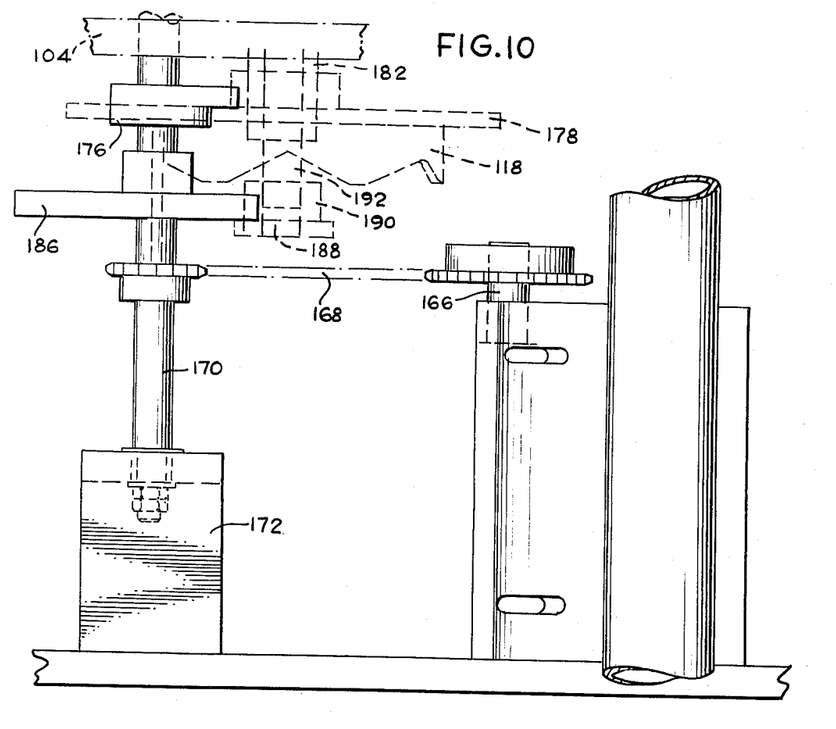

After sealing of the upper end of the pipettes following the filling operation, the pipettes are moved to station 30 wherein there is located an upstanding bracket 144. A blade 31 is positioned whereby the upper mounting means for the cylinders 46 secured to the bracket 48 will pass clear of the blade. Accordingly, the blade is adapted to cut the pipettes at a point near the end of the holder 18.

The blade 31 comprises a cutting edge portion 146 terminating in a cylindrical end 148. The blade is adapted to be secured to rod 150 which is journaled at its ends to rotate with respect to the bracket 144. The fingers 32 and 34 are secured to the bracket 144 at the points 152 and 154 respectively.

Member 156 secured to rod 150 is adapted to rotate in the counterclockwise direction through action of link 158. A compression spring 160 is located around a rod 161 which is secured to the member 156. As the link 158 causes movement of the member 156 with respect to the rod 150, the rod 161 is adapted to reciprocate within a hole formed in the plate 163.

The link 158 is adapted to be moved by the machine drive mechanism each time a filled and sealed pipette reaches the station 144. Movement of the link 158 results in movement of the cutting edge 146 of blade 31 into contact with the pipette. In the embodiment shown, the blade moves in behind the pipette in response to counter-clockwise rotation of the member 156. The spring 160 is adapted to restore the blade 31 to its normal position whereby a succeeding pipette can clear the blade prior to the succeeding movement of the blade behind this pipette.

As each pipette is severed, the fingers 32 and 34 serve to direct the pipettes into the chute 36 in the manner heretofore explained.

Scrap ejection

At the station 38 a drop-off 162 is provided in the ridge 122. As each roller 120 reaches this drop-off, compression spring 138 forces the piston 139 downwardly within the chamber 140. The resulting pressure built up within the chamber is sufficient to force the waste end of the pipette 12 out of the opening 42. The scrap material is deposited within the container 40 and each of the holders 18 is thus made ready for insertion of a new pipette 12.

In FIGURE 1 the drop-off 162 is illustrated in a position preceding the waste container 40. However, as will be apparent in the following description, the wheel 124 is adapted to move along with the plate 16 during certain portions of an operating cycle. This movement is synchronized whereby the ejection occurs when the drop-off is located opposite the waste container 40.

Drive means

Referring in particular to FIGURES 9 through 13, there is illustrated a main drive motor 164 provided for operating shaft 166. Chain 168 interconnects shaft 166 and shaft 170 whereby the latter is driven by the motor. The shaft 170 has one end journaled in box 172, while the other end extends above the plate 104 into a housing 174. A cam arm 176 on the shaft 170 is located for interaction with Geneva plate 178 secured on the top of cam 118.

The plate 178 is coupled by means of set screw 180 to a hollow shaft 182 which extends upwardly through casing 184. The shaft 182 is secured to plate 16 and, accordingly, the drive motor operates through shaft 170 and plate 178 to drive plate 16.

A cam element 186 is also secured to the shaft 170. This element is adapted to engage member 190 which is keyed to a shaft 192 disposed internally of shaft 182. The shaft 182 is operatively connected to wheel 124 and, accordingly, rotation of the shaft 192 results in corresponding rotation of the wheel 124.

Figure 11:
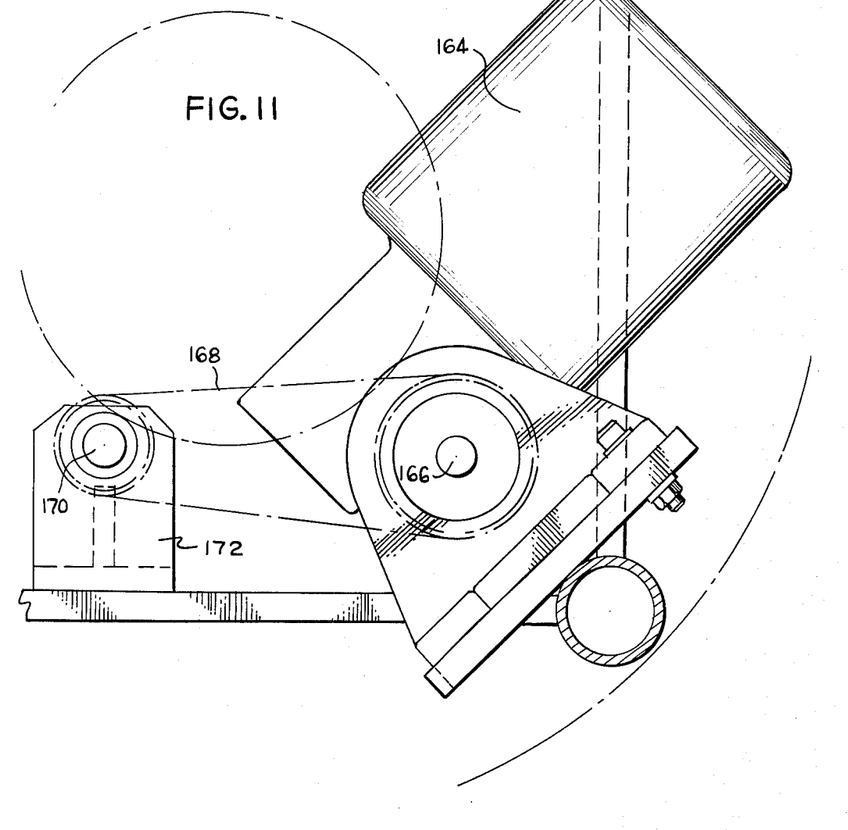
FIGURE 11 is a detail plan view of portions of the drive mechanism shown in FIGURE 10.

The wheel 124 is provided with teeth 194 in its face. A plurality of pinions 196, each interconnected with a holding means 18, are provided for engagement with the toothed rim of the wheel 124. It will be apparent that rotation of the plate 16 and the wheel 124 at different angular velocities will result in rotation of the pinions 196 and corresponding rotation of the associated holding means 18. On the other hand, rotation of the wheel 124 and the plate 16 at the same angular velocity will hold the pinions 196 and associated holding means in a stationary position.

It is desirable to provide for rotation of the pipettes 12, for example, during a heating operation, in order to provide for a uniform temperature build up. Similarly, rotation during the cutting operation facilitates the severing of the pipettes. The pipettes 12 are preferably restrained from rotary movement during the stamping operations.

The wheel 124 is adapted to oscillate within a confined area whereby the rise and drop-off portions of ridge 122 will be maintained in necessary positions. The oscillation of the wheel 124 is achieved by means of the cooperating action of cam element 186, and extension 198 and return arm 200 extending on opposite sides of the member 190. The particular design of the cam element 186 determines the time for rotation of the member 190 and, accordingly, the movement of the wheel 124 can be synchronized with the movement of the plate 16 to stop or change the speed of rotation of the holding means 18 at desired intervals.

It will be apparent that there has been described an apparatus capable of filling pipettes in a very rapid fashion. The apparatus is characterized by a minimum of handling of the pipettes and the material to be loaded therein. Furthermore, the sealed pipettes are adapted to be stored as they come from the machine without additional marking, sealing or other operations. Where the apparatus is to be employed for the subsequent use of the pipettes in the artificial insemination of cattle, refrigeration of the pipettes can be readily accomplished without damage thereto and without loss of the material therein. Furthermore, the plastic pipettes employed are particularly suitable for later operations involved in the insemination of the cattle.

The use of a drive mechanism of the type referred to is particularly desirable in that operation of the machine can be carried out rapidly and efficiently when automated. It will be understood, however, that the novelty in the individual stages and the unique combination of these operations is not dependent upon a particular drive mechanism and that other mechanisms capable of synchronizing the various operations, or adapted to individually operate the respective stages, are contemplated.

It will also be understood that various modifications can be made in the over-all operation and in the individual stages of the above described apparatus which provide the characteristics of this invention without departing from the spirit thereof, particularly as defined in the following claims.

I claim:

1. An apparatus for the filling of containers with liquid material comprising a plurality of holding means for said containers, a mounting plate for said holding means, means for moving said holding means and associated plate relative to stations in said apparatus, said moving means being adapted to rotate said plate to present said holding means to said stations, means associated with said plate for rotating said holding means relative to said plate during the rotation of said plate, said stations including a marking station having means for stamping identifying marks on said containers, a filling station comprising a receptacle for said material and means for drawing said material from said receptacle into said containers, a cut-off station comprising a cut-off blade for severing said containers and means for collecting the severed containers, and a waste-ejection station comprising means for ejecting the waste portions of said containers which are retained in said holding means after the severing operation, said apparatus further including means located between said filling station and said cut-off station for sealing said containers.

2. An apparatus in accordance with claim 1 wherein said holding means are journalled for rotary movement in said plate, said means for rotating the holding means comprising a toothed wheel, and gear teeth associated with said holding means engageable with said toothed wheel whereby relative movement of said toothed wheel and plate will result in rotation of said holding means.

3. An apparatus in accordance with claim 2 including drive means for rotating said toothed wheel, said drive means being adapted to rotate said wheel at an angular velocity different from the angular velocity of said plate whereby the relative movement therebetween will result in rotation of said holding means, and said drive means being adapted to rotate said wheel at the same speed as said plate whereby said holding means can be held stationary relative to said plate.

4. An apparatus for the filling of containers with liquid material comprising a plurality of holding means for said containers, means for moving said holding means relative to stations in said apparatus, said stations including a marking station having means for stamping identifying marks on said containers, said marking station including a support holding a stamping plate, resilient means normally positioning said support and associated plate out of the path of movement of said containers, yoke means connected to said support adapted to engage said holding means as they are moved to said marking station whereby said support moves in opposition to said resilient means and said plate is moved into the path of movement of said containers and presses against said containers, continued operation of said moving means resulting in disengagement of said yoke with said holding means whereby said resilient means restores said support to said normal position, a filling station comprising a receptacle for said material and means for drawing said material from said receptacle into said containers, a cut-off station comprising a cut-off blade for severing said containers and means for collecting the severed containers, and a waste-ejection station comprising means for ejecting the waste portions of said containers which are retained in said holding means after the severing operation, said apparatus further including means located between said filling station and said cut-off station for sealing said containers.

5. An apparatus for the filling of containers with liquid material comprising a plurality of holding means for said containers, means for continuously moving said holding means relative to stations in said apparatus, said stations including a marking station having means for stamping identifying marks on said containers, a filling station comprising a receptacle for said material and means for drawing said material from said receptacle into said containers, said receptacle comprising a dish mounted for vertical reciprocation, means for lowering said dish as each container approaches said filling station, means for raising said dish as the lower end of each container clears the rim of the dish whereby each lower end successively and individually dips into the material in the dish, means for creating suction within each container when the lower end thereof is in said dish whereby said material is drawn into the container, and means for lowering said dish whereby the filled containers are each adapted to clear the rim of the dish upon continued movement of the holding means.

6. An apparatus in accordance with claim 5 wherein said dish is normally urged to its raised position, cam means rotatable with said holding means, a lever having one end operatively connected to said dish, and a cam follower connected to the other end of said lever, said cam defining recessed portions and raised portions corresponding ot the number and relative spacing of said holding means whereby said dish is raised and lowered automatically in accordance with the position of each holding means relative to said dish.

7. An apparatus for the filling of containers with liquid material comprising a plurality of holding means for said containers, said holding means defining a bore communicating with one end of a container held by said holding means, a piston mounted for reciprocal movement in said bore, means for raising said piston to create suction whereby liquid material is adapted to be drawn into said containers, and means for forcing said piston downwardly whereby waste portions of said containers are adapted to be subjected to pressure and forced out of said holding means, means for moving said holding means relative to stations in said apparatus, said stations including a marking station having means for stamping identifying marks on said containers, a filling station comprising a receptacle for said material, means operating in response to movement of each container to said filling station for raising said piston to create said suction in each container, a cut-off station comprising a cut-off blade for severing filled containers and means for connecting the severed containers, a waste-ejection station and means for causing said piston to be forced downwardly in response to movement of each container to said waste-ejection station whereby the waste portions retained in said holding means after the severing operation can be removed.

8. An apparatus in accordance with claim 7 including lift means associated with each piston in said holding means, actuating means positioned adjacent the path of movement of said holding means for engaging said lift means to raise said piston when the holding means is disposed over said receptacle, means normally urging said piston means to a downward position, and means included in said actuating means for releasing said lift means to provide for downward movement of said piston means.

9. An apparatus in accordance with claim 8 wherein said lift means comprises a bearing member and said actuating means comprising an upstanding ridge, said bearing member being adapted to ride up said ridge to raise said piston, and a drop-off defined by said ridge to provide for rapid downward movement of said piston for ejecting said waste portions when each bearing member reaches said drop-off.

10. An apparatus for the filling of pipettes having small diameter orifices therein with liquid material comprising a plurality of holding means for resiliently holding the upper ends of said pipettes, a plate adapted to rotate in said apparatus, said holding means being mounted on said plate, means for continuously rotating said plate and associated holding means relative to stations in said apparatus, said stations including a marking station having means for stamping identifying marks on said pipettes, a filling station comprising a receptacle for said material and means for drawing said material from said receptacle into said pipettes, means synchronized for movement with said plate for raising and lowering said receptacle whereby the lower end of each successive pipette is adapted to clear the rim of said receptacle, to be thereafter immersed in the liquid material held by said receptacle when the receptacle is raised and to thereafter clear the opposite rim of said receptacle when said receptacle is lowered, a cut-off station comprising a cut-off blade for severing said pipettes and means for collecting the severed pipettes, and a waste-ejection station comprising means for ejecting the waste portions of said pipettes which are retained in said holding means after the severing operation, said apparatus further including means located between said filling station and said cut-off station for sealing said pipettes.

11. An apparatus for the filling of pipettes having small diameter orifices therein with liquid material comprising a plurality of holding means for resiliently holding the upper ends of said pipettes, a plate adapted to rotate in said apparatus, said holding means being mounted on said plate, means for continuously moving said plate and associated holding means relative to stations in said apparatus, said stations including first and second marking stations comprising movable stamping means adapted to move into contact with said pipettes as they move through said marking stations, a filling station comprising a vertically reciprocal dish containing said liquid material, means synchronized for movement with said rotating means for raising and lowering said receptacle whereby the lower ends of said pipettes can be immersed in said material and withdrawn therefrom, means associated with said holding means for drawing said material from said dish into said orifices, a cut-off station comprising a cut-off blade for severing said pipettes and means for collecting the severed pipettes, and a waste-ejection station comprising means for ejecting the waste portions of said pipettes which are retained in said holding means after the severing operation, said apparatus further including means located between said filling station and said cut-off station for sealing said pipettes.

12. An apparatus according to claim 11 wherein the means for drawing the material into said pipettes comprises a piston located within said holding means, and means operating responsive to positioning of said holding means over said dish for raising said piston when said pipettes are immersed within said material whereby suction is created within said pipettes.

References Cited by the Examiner
UNITED STATES PATENTS

| | | | |
|---|---|---|---|
| 2,530,230 | 11/50 | Cozzoli | 53—266 X |
| 2,540,059 | 1/51 | Stirn | 53—22 X |
| 2,838,893 | 6/58 | Sickel | 53—131 X |
| 2,877,611 | 3/59 | Anref | 53—22 X |
| 3,012,386 | 12/61 | Pechmann | 53—131 X |

FRANK E. BAILEY, *Primary Examiner.*

BROMLEY SEELEY, *Examiner.*